(12) United States Patent
Bansal et al.

(10) Patent No.: US 10,810,233 B2
(45) Date of Patent: Oct. 20, 2020

(54) LINKING RECORDS BETWEEN DATASETS TO AUGMENT QUERY RESULTS

(71) Applicant: salesforce.com, inc., San Francisco, CA (US)

(72) Inventors: Kaushal Bansal, Pleasanton, CA (US); Venkata Muralidhar Tejomurtula, Danville, CA (US); Azeem Feroz, San Jose, CA (US); Dmytro Kashyn, Holliston, MA (US); Dmytro Kudriavtsev, Belmont, CA (US)

(73) Assignee: salesforce.com, inc., San Francisco, CA (US)

( * ) Notice: Subject to any disclaimer, the term of this patent is extended or adjusted under 35 U.S.C. 154(b) by 311 days.

(21) Appl. No.: 15/844,311

(22) Filed: Dec. 15, 2017

(65) Prior Publication Data
US 2019/0188313 A1  Jun. 20, 2019

(51) Int. Cl.
| | | |
|---|---|---|
| G06F 7/02 | (2006.01) | |
| G06F 16/00 | (2019.01) | |
| G06F 16/28 | (2019.01) | |
| G06F 16/23 | (2019.01) | |
| G06F 16/9535 | (2019.01) | |
| G06F 16/25 | (2019.01) | |
| G06F 16/2458 | (2019.01) | |

(52) U.S. Cl.
CPC ........ *G06F 16/285* (2019.01); *G06F 16/2379* (2019.01); *G06F 16/2471* (2019.01); *G06F 16/25* (2019.01); *G06F 16/9535* (2019.01)

(58) Field of Classification Search
CPC ............... G06F 16/285; G06F 16/9535; G06F 16/2379; G06F 16/245; G06F 16/221; G06F 21/62
See application file for complete search history.

(56) References Cited

U.S. PATENT DOCUMENTS

| | | |
|---|---|---|
| 7,730,478 B2 | 6/2010 | Weissman |
| 7,779,039 B2 | 8/2010 | Weissman et al. |
| 9,245,145 B2 | 1/2016 | Wo et al. |
| 9,378,263 B2 | 6/2016 | Khimich et al. |
| 9,979,587 B2 | 5/2018 | Tejomurtula et al. |
| 10,097,667 B2 | 10/2018 | Wo et al. |

(Continued)

OTHER PUBLICATIONS

Non-Final Office Action, U.S. Appl. No. 15/828,118, dated Jan. 16, 2020, 18 pages.

*Primary Examiner* — Bruce M Moser
(74) *Attorney, Agent, or Firm* — NDWE LLP

(57) ABSTRACT

A method for linking records from different datasets based on record similarities is described. The method includes ingesting a first dataset, including a first set of records with a first set of fields, wherein the first dataset is associated with a first vendor and a first type of data, and a second dataset, including a second set of records with a second set of fields, wherein the second dataset is associated with a second vendor and a second type of data; determining that a first record from the first set of records is similar to a second record from the second set of records based on similarities between fields in the first and second set of fields; and linking the first and second records in response to determining that the similarity, wherein the first and second vendors are different and/or the first and second types of data are different.

19 Claims, 12 Drawing Sheets

(56) References Cited

U.S. PATENT DOCUMENTS

| | | |
|---|---|---|
| 10,152,497 B2 | 12/2018 | Doan et al. |
| 10,191,939 B2 * | 1/2019 | Malygin et al. |
| 10,445,062 B2 * | 10/2019 | Oberbreckling .......... G06F 7/02 |
| 2012/0143819 A1 * | 6/2012 | Tan ....................... G06F 16/258 |
| | | 707/626 |
| 2013/0275363 A1 | 10/2013 | Wu et al. |
| 2013/0339366 A1 | 12/2013 | Khimich et al. |
| 2013/0339490 A1 | 12/2013 | Tejomurtula et al. |
| 2014/0019488 A1 | 1/2014 | Wo et al. |
| 2015/0039649 A1 | 2/2015 | Andrews et al. |
| 2015/0058422 A1 | 2/2015 | Malygin et al. |
| 2016/0112538 A1 | 4/2016 | Wo et al. |
| 2016/0255139 A1 | 9/2016 | Rathod |
| 2017/0242868 A1 | 8/2017 | Doan et al. |
| 2017/0242891 A1 | 8/2017 | Doan et al. |
| 2017/0286441 A1 | 10/2017 | Doan et al. |
| 2018/0165281 A1 | 6/2018 | Jagota et al. |
| 2018/0165294 A1 | 6/2018 | Jagota et al. |
| 2018/0165354 A1 | 6/2018 | Jagota et al. |
| 2018/0357443 A1 * | 12/2018 | Joscelyne ........... G06F 21/6227 |
| 2018/0373732 A1 | 12/2018 | Jagota et al. |
| 2019/0155938 A1 | 5/2019 | Kudriavtsev et al. |
| 2019/0163786 A1 | 5/2019 | Bansal et al. |
| 2019/0230081 A1 | 7/2019 | Singh et al. |
| 2019/0230169 A1 | 7/2019 | Elangovan et al. |
| 2019/0236178 A1 | 8/2019 | Jagota et al. |
| 2019/0236460 A1 | 8/2019 | Jagota et al. |
| 2020/0042626 A1 * | 2/2020 | Curtis ..................... G06F 16/25 |

* cited by examiner

VENDOR DATASET 112A

| | FIELD 301A$_1$ | FIELD 301A$_2$ | FIELD 301A$_3$ | ... | FIELD 301A$_X$ |
|---|---|---|---|---|---|
| RECORD 303A$_1$ | FIELD VALUE 305A$_{1,1}$ | FIELD VALUE 305A$_{1,2}$ | FIELD VALUE 305A$_{1,3}$ | ... | FIELD VALUE 305A$_{1,X}$ |
| RECORD 303A$_2$ | FIELD VALUE 305A$_{2,1}$ | FIELD VALUE 305A$_{2,2}$ | FIELD VALUE 305A$_{2,3}$ | ... | FIELD VALUE 305A$_{2,X}$ |
| ⋮ | ⋮ | ⋮ | ⋮ | ⋱ | ⋮ |
| RECORD 303A$_Y$ | FIELD VALUE 305A$_{Y,1}$ | FIELD VALUE 305A$_{Y,2}$ | FIELD VALUE 305A$_{Y,3}$ | ... | FIELD VALUE 305A$_{Y,X}$ |

VENDOR DATASET 112B

| | FIELD 301B$_1$ | FIELD 301B$_2$ | FIELD 301B$_3$ | ... | FIELD 301B$_R$ |
|---|---|---|---|---|---|
| RECORD 303B$_1$ | FIELD VALUE 305B$_{1,1}$ | FIELD VALUE 305B$_{1,2}$ | FIELD VALUE 305B$_{1,3}$ | ... | FIELD VALUE 305B$_{1,R}$ |
| RECORD 303B$_2$ | FIELD VALUE 305B$_{2,1}$ | FIELD VALUE 305B$_{2,2}$ | FIELD VALUE 305B$_{2,3}$ | ... | FIELD VALUE 305B$_{2,R}$ |
| ⋮ | ⋮ | ⋮ | ⋮ | ⋱ | ⋮ |
| RECORD 303B$_T$ | FIELD VALUE 305B$_{T,1}$ | FIELD VALUE 305B$_{T,2}$ | FIELD VALUE 305B$_{T,3}$ | ... | FIELD VALUE 305B$_{T,R}$ |

INDEX SERVICE 130

INDEXED DATASET 220A

| | FIELD $301A_1$ | FIELD $301A_2$ | FIELD $301A_3$ | ... | FIELD $301A_X$ | MATCH KEY FIELD 501A |
|---|---|---|---|---|---|---|
| RECORD $303A_1$ | FIELD VALUE $305A_{1,1}$ | FIELD VALUE $305A_{1,2}$ | FIELD VALUE $305A_{1,3}$ | ... | FIELD VALUE $305A_{1,X}$ | Concatenate$(305A_{1,3}, 305A_{1,2})$ $401A_1$ |
| RECORD $303A_2$ | FIELD VALUE $305A_{2,1}$ | FIELD VALUE $305A_{2,2}$ | FIELD VALUE $305A_{2,3}$ | ... | FIELD VALUE $305A_{2,X}$ | Concatenate$(305A_{2,3}, 305A_{2,2})$ $401A_2$ |
| ⋮ | ⋮ | ⋮ | ⋮ | ⋱ | ⋮ | ⋮ |
| RECORD $303A_Y$ | FIELD VALUE $305A_{Y,1}$ | FIELD VALUE $305A_{Y,2}$ | FIELD VALUE $305A_{Y,3}$ | ... | FIELD VALUE $305A_{Y,X}$ | Concatenate$(305A_{Y,3}, 305A_{Y,2})$ $401A_Y$ |

INDEXED DATASET 220B

| | FIELD $301B_1$ | FIELD $301B_2$ | FIELD $301B_3$ | ... | FIELD $301B_R$ | MATCH KEY FIELD 501B |
|---|---|---|---|---|---|---|
| RECORD $303B_1$ | FIELD VALUE $305B_{1,1}$ | FIELD VALUE $305B_{1,2}$ | FIELD VALUE $305B_{1,3}$ | ... | FIELD VALUE $305B_{1,R}$ | Concatenate$(305B_{1,2}, 305B_{1,3})$ $401B_1$ |
| RECORD $303B_2$ | FIELD VALUE $305B_{2,1}$ | FIELD VALUE $305B_{2,2}$ | FIELD VALUE $305B_{2,3}$ | ... | FIELD VALUE $305B_{2,R}$ | Concatenate$(305B_{2,2}, 305B_{2,3})$ $401B_2$ |
| ⋮ | ⋮ | ⋮ | ⋮ | ⋱ | ⋮ | ⋮ |
| RECORD $303B_T$ | FIELD VALUE $305B_{T,1}$ | FIELD VALUE $305B_{T,2}$ | FIELD VALUE $305B_{T,3}$ | ... | FIELD VALUE $305B_{T,R}$ | Concatenate$(305B_{T,2}, 305B_{T,3})$ $401B_T$ |

DATA ASSESSMENT SERVICE
136

INDEXED DATASET
220A

| | ID 301A$_1$ | STREET ADDRESS 301A$_2$ | PHONE NUMBER 301A$_3$ | MATCH KEY FIELD 501A | LINK FIELD 601A |
|---|---|---|---|---|---|
| RECORD 303A$_1$ | 13561 | 1 Elm St. | 555-555-5555 | 555-555-55551 Elm St. | 32451 |
| | 305A$_{1,1}$ | 305A$_{1,2}$ | 305A$_{1,3}$ | 401A$_1$ | 603A$_1$ |

INDEXED DATASET
220B

| | ID 301B$_1$ | PHONE NUMBER 301B$_2$ | STREET ADDRESS 301B$_3$ | MATCH KEY FIELD 501B | LINK FIELD 601B |
|---|---|---|---|---|---|
| RECORD 303B$_4$ | 32451 | 555-555-5555 | 1 Elm St. | 555-555-55551 Elm St. | 13561 |
| | 305B$_{4,1}$ | 305B$_{4,2}$ | 305B$_{4,3}$ | 401B$_4$ | 603B$_4$ |

FIG. 6

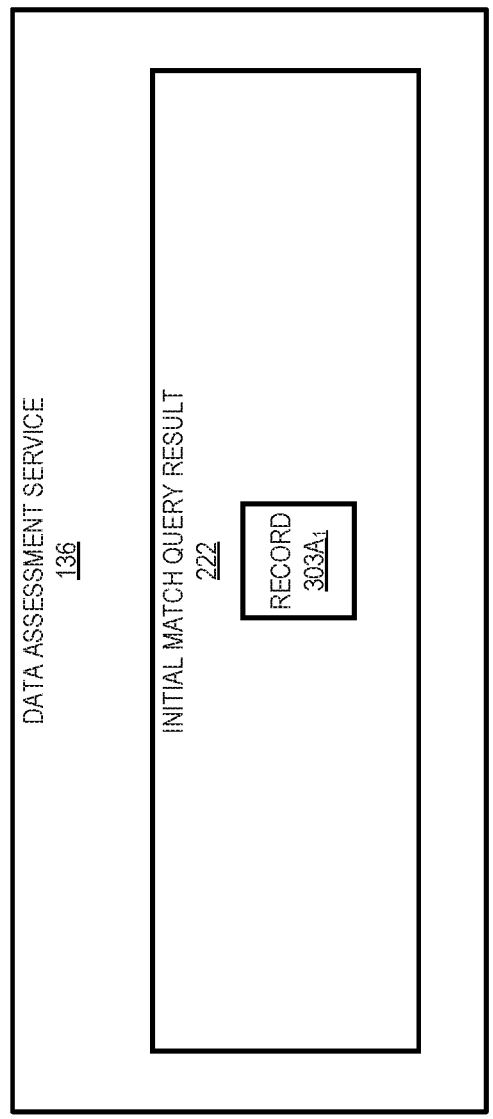

LINKING RECORDS BETWEEN DATASETS TO AUGMENT QUERY RESULTS

TECHNICAL FIELD

One or more implementations relate to the field of dataset management; and more specifically, to linking records within a data as a service ("DaaS" or "DAAS") system such that when querying a first dataset, similar records are provided to a customer from a second dataset.

BACKGROUND

In a DAAS system, a set of one or more vendors may each provide one or more vendor datasets for ingestion into the DAAS system. The DAAS system may thereafter process the vendor datasets for access by one or more customers. For example, a first vendor may provide to the DAAS system a company dataset, which includes records reflecting various companies, and a contact dataset, which includes records reflecting various contacts. The DAAS system may process the company and contact datasets, including ingestion, analysis, and indexing, to make both datasets available for queries by one or more customers that are authorized to access each dataset. For instance, a customer may have access to the company dataset of the first vendor such that the DAAS system will query the company dataset in response to a search or match query from the customer and the DAAS system may return a query result (i.e., zero or more records from the company dataset) to the customer. Similarly, the customer may have access to the contact dataset of the first vendor such that the DAAS system will perform a query on the contact dataset in response to a search or match query from the customer and the DAAS system may return a query result (i.e., zero or more records from the contact dataset) to the customer. Accordingly, as described, the separate queries must be performed on each dataset based on separate requests. However, in some cases, the query results from the query of the company dataset and the query results from the query of the contacts dataset may include similar records (e.g., a record in the query result of the contact dataset is an employee of a company reflected in a record of the query result of the company dataset). In this situation, the customer must recognize the similar records in the separate query results without assistance from the DAAS system.

In another example, in addition to the company dataset and the contact dataset from the first vendor, a second vendor may provide an opportunity dataset to the DAAS system. The DAAS system may process the opportunity dataset, including ingestion, analysis, and indexing, to make the opportunity dataset available for queries by one or more customers that are authorized to access the dataset. For example, the same customer that queried the company dataset in the example above, may have access to the opportunity dataset of the second vendor such that the DAAS system will perform a query on the opportunity dataset in response to a search or match query from the customer and return a query result (i.e., zero or more records from the opportunity dataset) to the customer. In some cases, the query result from the query of the company dataset and the query result from the query of the opportunity dataset may include similar records (e.g., a record in the query result of the opportunity dataset involves a company reflected in a record of the query result of the company dataset). Again, in this situation, the customer must recognize the similar records in the separate query results without assistance from the DAAS system.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 3 shows examples of two vendor datasets according to one example implementation.

FIG. 5 shows match keys for each record of the two vendor datasets according to one example implementation.

FIG. 6 shows a record for one indexed dataset linked to a record from another indexed dataset according to one example implementation.

FIG. 9A shows an initial match query result according to one example implementation.

DETAILED DESCRIPTION

Figure 1:
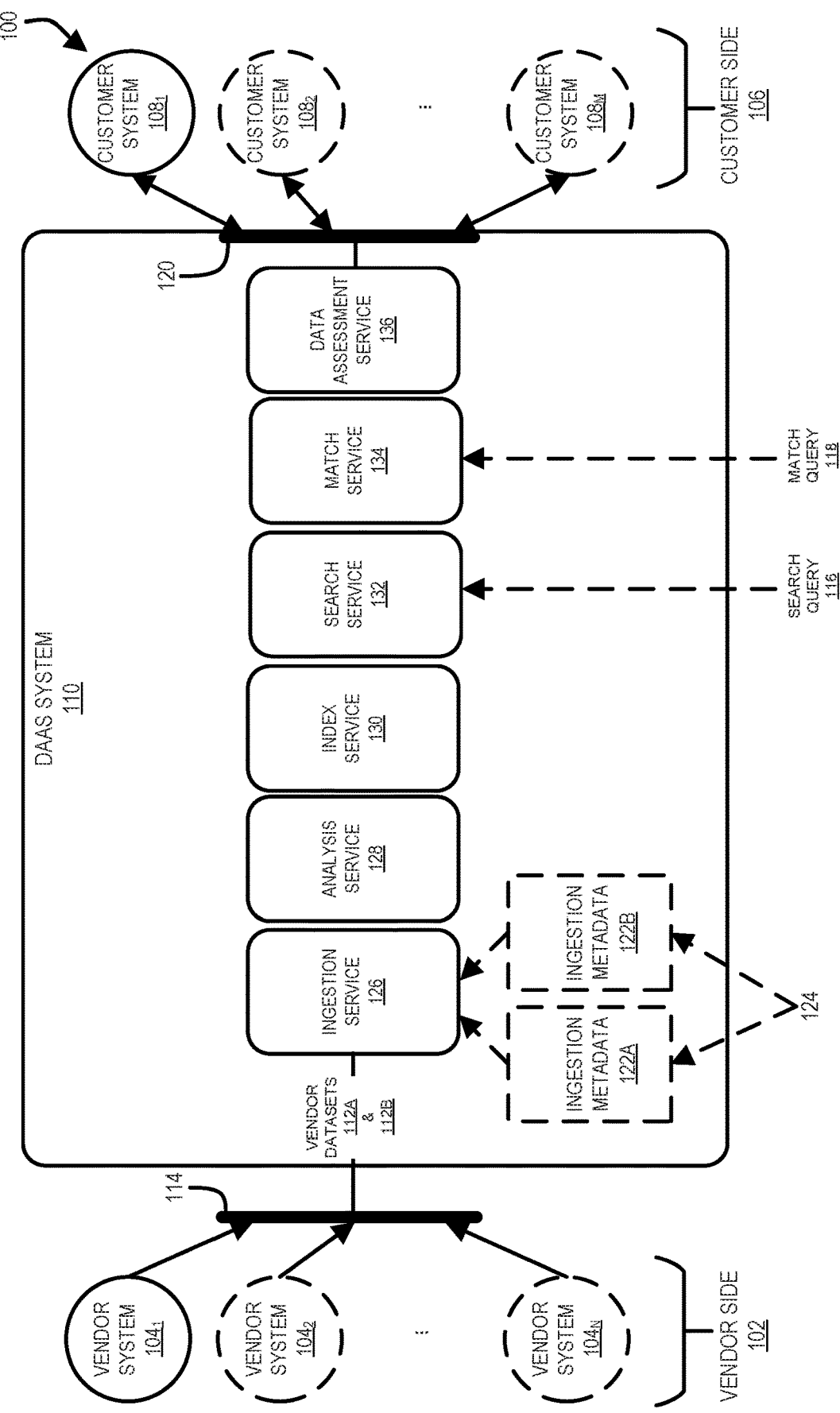
FIG. 1 shows a block diagram of a DAAS architecture that provides on-demand data services according to one example implementation.

FIG. 1 is a block diagram of a DAAS architecture 100 that provides on-demand data services according to one example implementation. FIG. 1 divides the DAAS architecture 100 into three portions: a vendor side 102, including a set of vendor systems $104_1$-$104_N$ (where N is greater than or equal to one); a customer side 106, including a set of customer systems $108_1$-$108_M$ (where M is greater than or equal to one); and a DAAS system 110. In this configuration, the vendor systems $104_1$-$104_N$ may each provide one or more vendor datasets 112 that are ingested, analyzed, and/or indexed by the DAAS system 110. The DAAS system 110 may thereafter use these ingested, analyzed, and/or indexed datasets for performing queries for the customer systems 108 using one or more of the search service 132 and the match service 134 such that the customer systems 108 may import desired records from the vendor datasets 112 into databases of the customer systems 108 via the ingestion interface 114. This querying and importation may be performed based on (1) a search query 116 that seeks to provide a customer system 108 with new records from a vendor dataset 112 for importation and/or (2) a match query 118 that seeks to provide a customer system 108 with updates to records already imported into the customer system 108. For example, one or more vendor systems 104 may provide vendor dataset 112A and vendor dataset 112B to the DAAS system 110 (e.g., the vendor datasets 112A and 112B may both be provided by the vendor system $104_1$ or vendor dataset 112A may be provided by the vendor system $104_1$ and the vendor dataset 112B may be provided by the vendor system $104_2$).

In one implementation, the vendor dataset 112A and the vendor dataset 112B may be associated with different types of data (e.g., the vendor dataset 112A may include records related to companies and the vendor dataset 112B may include records related to contacts). The vendor dataset 112A and the vendor dataset 112B, which each may be transformed via an ingestion service 126 to produce corresponding ingested datasets, via an analysis service 128 to produce corresponding analyzed datasets, and/or via an index service 130 to produce corresponding indexed datasets, are stored and persisted in one or more databases. A customer, using one of the customer systems 108 and having contracted with an administrator of the DAAS system 110 to have access to the vendor dataset 112A and the vendor dataset 112B, may request the DAAS system 110 to query the vendor dataset 112A and/or the vendor dataset 112B for records that meet criteria of a query (e.g., criteria of the search query 116 or criteria of the match query 118).

In some implementations, the ingestion service 126 may ingest vendor dataset 112A using ingestion metadata 122A and vendor dataset 112B using ingestion metadata 122B. The ingestion metadata 122A and 122B may each be provided by a source 124 outside the DAAS system 110 (e.g., an administrator of the DAAS system 110). Each of the ingestion metadata 122A and 122B includes mappings of fields used within the corresponding vendor dataset 112A and 112B to fields defined within the DAAS system 110. In one implementation, the mappings included within the ingestion metadata 122A and 122B may be used by the ingestion service 126 to verify that the structure of the respective vendor dataset 112A and 112B (e.g., the set of fields in the vendor datasets 112A and 112B) complies with a structure agreed on between a vendor(s) of the vendor system(s) 104 providing the vendor datasets 112A and 112B to the DAAS system 110 and an administrator of the DAAS system 110.

To improve a search query result and/or a match query result provided by the DAAS system 110 to a customer system 108 of a customer, a data assessment service 136 may link a record from vendor dataset 112A to a record of vendor dataset 112B in response to determining that the records in these separate vendor datasets 112A and 112B are similar. For example, a record in the vendor dataset 112A (e.g., a record related to a company) may be linked by the data assessment service 136 to a record in the vendor dataset 112B (e.g., a record related to a contact) in response to determining that the record in the vendor dataset 112A is similar to the record in the vendor dataset 112B. A search query result or a match query result for a vendor dataset 112A may be generated based on links to records in the vendor dataset 112B. For example, based on a search query 116 directed to the vendor dataset 112A, the search service 132 may generate an initial search query result that includes a record in the vendor dataset 112A that meets the criteria of the search query 116. This record in the vendor dataset 112A may be linked by the data assessment service 136 to a record in the vendor dataset 112B based on a determined similarity between the records. Based on this link, the data assessment service 136 may add the linked record from the vendor dataset 112B to the initial search query result to generate a final search query result that is provided to a customer system 108 via a serving interface 120. Accordingly, the final search query result includes records from the vendor dataset 112A that meet the criteria of the search query 116 and records in the vendor dataset 112B that link to records in the vendor dataset 112A that meet the criteria of the search query 116. These records from the vendor dataset 112B may be marked or otherwise presented to a customer of the customer system 108 as recommended records.

Similarly, based on a match query 118 directed to the vendor dataset 112A, the match service 134 may generate an initial match query result that includes a record in the vendor dataset 112A that meets the criteria of the match query 118. This record in the vendor dataset 112A may be linked by the data assessment service 136 to a record in the vendor dataset 112B based on a determined similarity between the records. Based on this link, the data assessment service 136 may add the linked record from the vendor dataset 112B to the initial match query result to generate a final match query result that is provided to a customer system 108 via the serving interface 120. Accordingly, the final match query result includes records from the vendor dataset 112A that meet the criteria of the match query 118 and records in the vendor dataset 112B that link to records in the vendor dataset 112A that meet the criteria of the match query 118. These records from the vendor dataset 112B may be marked or otherwise presented to a customer of the customer system 108 as recommended records. By linking records in separate vendor datasets 112, the DAAS system 110, and in particular the data assessment service 136, provides cross vendor query functionality and data record recommendations across vendor datasets 112 based on record similarity. This eliminates the need for vendors to manually determine similarity between records of different vendor datasets 112 that are possibly provided by different vendors and vendor systems 104 and/or are of different data types.

In one implementation, a determination that two records are similar may be based on the similarity of one or more fields in each vendor dataset 112A and 112B (e.g., a field of a record in the vendor dataset 112A is identical or is within a threshold (e.g., a 90% match) of a field of a record in the vendor dataset 112B). For example, as will be described in greater detail below, match keys, which are the combination of two or more fields or an individual field of a vendor dataset 112, may be generated for each record in the vendor datasets 112A and 112B. In response to detecting a similarity between a match key of a record in the vendor dataset 112A and a match key of a record in the vendor dataset 112B (e.g., being identical or being within a threshold), the data assessment service 136 may determine that the records are similar. On the basis of this determined similarity, the data assessment service 136 may link the records.

As noted above, the vendor datasets 112A and 112B may be provided by different vendor systems 104 and vendors or provided by the same vendor system 104 and vendor. In some implementations, the type of data provided by the vendor dataset 112A may be the same or different from the type of data provided by the vendor dataset 112B. For example, the vendor dataset 112A may provide company data and the vendor dataset 112B may provide contact data (i.e., the vendor datasets 112A and 112B provide different types of data). In one implementation, the vendor datasets 112A and 112B may be considered to provide different types of data if the vendor dataset 112A includes fields that are not fields of the vendor dataset 112B.

In some implementations, the DAAS system 110 may be a multi-tenant system. As a multi-tenant DAAS system, the DAAS system 110 may include a single instance of each of the ingestion service 126, the analysis service 128, the index service 130, and/or the data assessment service 136 that may be accessed by multiple vendor systems 104 (also known as tenants) and each vendor system 104 is provided with a dedicated share of a software instance of each of the ingestion service 126, the analysis service 128, the index service 130, and/or the data assessment service 136. Similarly, the DAAS system 110 may include a single instance of each of the search service 132, the match service 134, and/or the data assessment service 136 that may be accessed by multiple vendor systems 104 and each vendor system 104 is provided with a dedicated share of a software instance of each of the search service 132, the match service 134, and/or the data assessment service 136. As a multi-tenant system, the DAAS system 110 may link records between the vendor datasets 112A and 112B and generate a final search query result and/or a final match query result for the vendor dataset 112A based on linked records in the vendor dataset 112B.

In other implementations, the DAAS system 110 may be a single-tenant system and may operate in a similar fashion to generate a final search query result and/or a final match query result as described above in relation to the DAAS system 110 operating as a multi-tenant system. Accordingly, the implementation of the DAAS system 110 as a multi-tenant or single-tenant system does not alter the functionality of the DAAS system 110 and associated components described herein.

Figure 2:
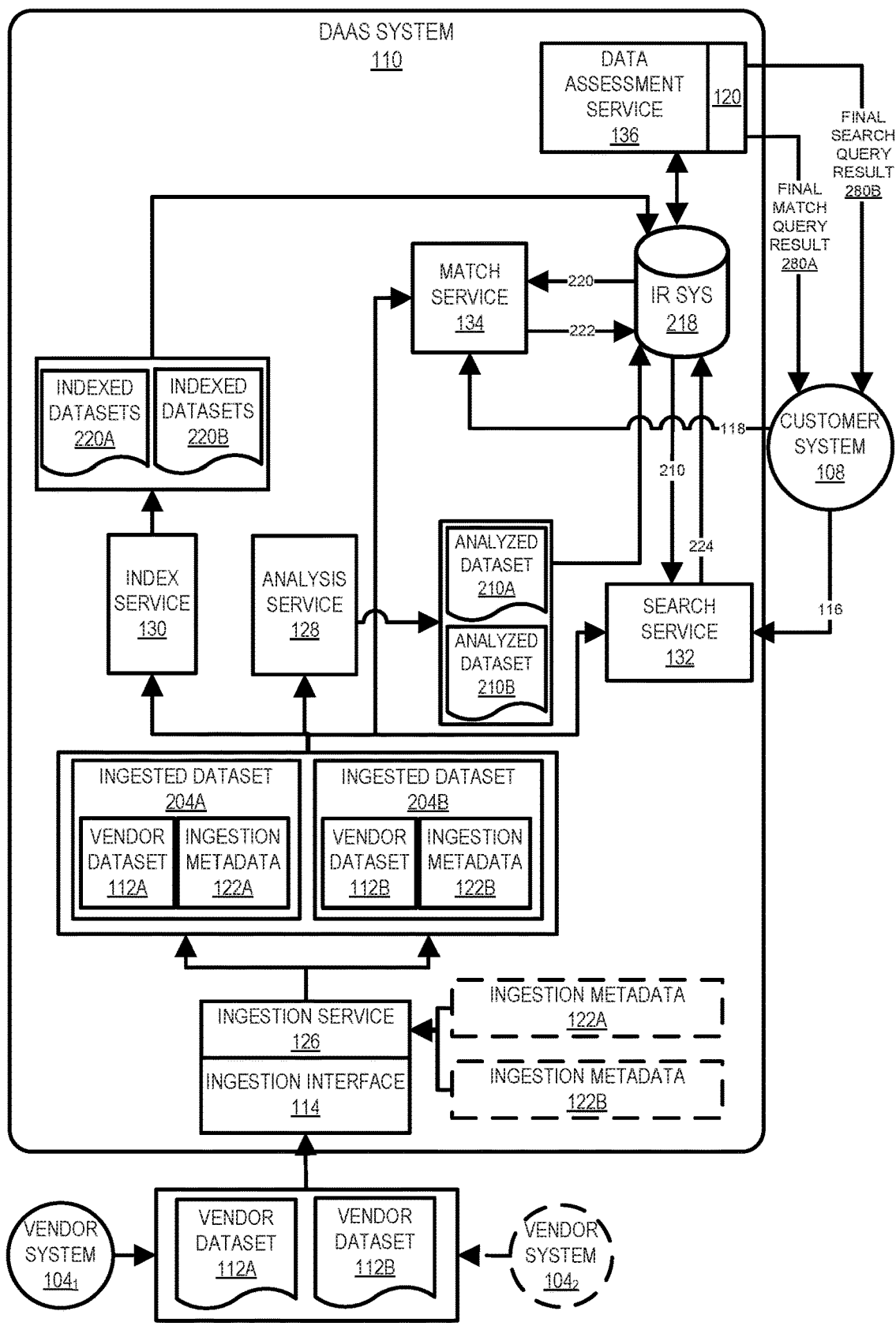
FIG. 2 shows a more detailed block diagram of a DAAS system that links records from different vendor datasets according to one example implementation.

FIG. 2 shows a more detailed block diagram of a DAAS system 110 that links records from different vendor datasets 112A and 112B according to one example implementation. As shown in FIG. 2, the DAAS system 110 receives, via the ingestion interface 114, the vendor datasets 112A and 112B for ingestion by the ingestion service 126 to produce corresponding ingested datasets 204A and 204B. In one implementation, the vendor datasets 112A and 112B may be provided by different vendors systems 104 and vendors (e.g., the vendor system $104_1$ provides the vendor dataset 112A and the vendor system $104_2$ provides the vendor dataset 112B) or the vendor datasets 112A and 112B may be provided by the same vendor system 104 and the same vendor (e.g., the vendor system $104_1$ provides both vendor datasets 112A and 112B).

Each of the vendor datasets 112A and 112B may include any set of data, including any type of data (e.g., company data, contact data, account data, opportunity data, event data, etc.), and may be represented in any format. In one implementation, the vendor datasets 112A and 112B may each be vendor data that is intended to be made accessible to one or more of the customers and/or customer systems 108. For example, each of the vendor datasets 112A and 112B may include one of company data, contact data, account data, opportunity data, or event data for a set of business leads and may be represented in flat database structures. In a flat database structure, the vendor datasets 112A and 112B may be represented in a single table (or database object) or as a single data record, which is separated by delimiters, such as tabs or commas (e.g., Comma-Separated Values (CSV) or JavaScript Object Notation (JSON) file). In other implementations, the vendor datasets 112A and 112B may each be provided as a set of relational database tables (or database objects) or in another type of database structure or data format.

FIG. 3 shows an example of the vendor dataset 112A and the vendor dataset 112B according to one example implementation. As shown, the vendor dataset 112A includes fields $301A_{1-X}$ with field values $305A_{1,1}$-$305A_{Y,X}$ corresponding to the records $303A_{1-Y}$ (where X and Y are each greater than or equal to one). Similarly, the vendor dataset 112B includes fields $301B_{1-R}$ with field values $305B_{1,1}$-$305B_{T,R}$ corresponding to the records $303B_{1-T}$ (where R and T are each greater than or equal to one). For example, the fields $301A_{1-X}$ may include an identifier field, a company name field, a company type field, a country field, a street address field, a phone number field, and a domain field while the fields $301B_{1-R}$ may include an identifier field, a contact name field, a country field, a phone number field, an employee title field, and a street address field.

Each of the fields $301A_{1-X}$ and $301B_{1-R}$ may or may not be defined within the DAAS system 110. The DAAS system 110, and in particular the ingestion service 126, may use ingestion metadata 122A and 122B for each respective vendor dataset 112A and 112B (e.g., the ingestion metadata 122A is used in relation to the vendor dataset 112A and the ingestion metadata 122B is used in relation to the vendor dataset 112B). Each of the ingestion metadata 122A and 122B includes mappings of one or more fields used within the corresponding vendor dataset 112A and 112B (e.g., one or more of the fields $301A_{1-X}$ and $301B_{1-R}$) to fields defined within the DAAS system 110. In one implementation, the mappings included within the ingestion metadata 122A may be used by the ingestion service 126 to verify that the structure of the vendor dataset 112A (e.g., the set of fields $301A_{1-X}$ in the vendor dataset 112A) complies with a structure agreed on between a vendor of the vendor system 104 providing the vendor dataset 112A to the DAAS system 110 and an administrator of the DAAS system 110. Similarly, the mappings included within the ingestion metadata 122B may be used by the ingestion service 126 to verify that the structure of the vendor dataset 112B (e.g., the set of fields $301B_{1-R}$ in the vendor dataset 112B) complies with a structure agreed on between a vendor of the vendor system 104 providing the vendor dataset 112B to the DAAS system 110 and an administrator of the DAAS system 110.

In some implementations, the ingestion interface 114 may permit a vendor system(s) 104 to provide the vendor dataset 112A and the vendor dataset 112B to the DAAS system 110 for ingestion over a network. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data (e.g., a vendor dataset 112) from a vendor system 104 to the DAAS system 110. In some implementations, the ingestion interface 114 may utilize a File Transfer Protocol (FTP), a Network File System (NFS), or a similar protocol/system.

In one implementation, each of the ingested datasets 204A and 204B may be a combination of a vendor dataset 112A and 112B and corresponding ingestion metadata 122A and 122B. Each of the ingestion metadata 122A and 122B may be later used by various other components of the DAAS system 110 (e.g., the analysis service 128, the index service 130, the search service 130, the match service 134, and/or the data assessment service 136) for accessing data from the vendor dataset 112A and the vendor dataset 112B (e.g., for cross-referencing records in a vendor dataset 112 with records in another dataset (e.g., an indexed dataset 112 or an analyzed dataset 210) based on ingestion metadata 122).

As noted above, the ingestion service 126 may generate the ingested dataset 204A corresponding to the vendor dataset 112A and the ingested dataset 204B corresponding to the vendor dataset 112B based on the ingestion metadata 122A and 122B, respectively, and may store the ingested datasets 204A and 204B (e.g., in direct pipeline storage) pending further processing by the DAAS system 110.

In one implementation, the data assessment service 136 may determine links between records 303 in the vendor dataset 112A and the vendor dataset 112B based on similarities between records 303 in the vendor dataset 112A and the vendor dataset 112B. In one implementation, similarities between a record 303A in the vendor dataset 112A and a record 303B in the vendor dataset 112B may be determined based on similarities between fields values 305 of records 303. In this implementation, the ingestion metadata 122A and 122B may be used for determining identical fields 301 between the vendor datasets 112A and 112B such that field values 305 may be compared. For example, the ingestion metadata 122A may indicate that the field $301A_2$ may correspond to a street address field and the ingestion metadata 122B may indicate that the field $301B_3$ may also correspond to a street address field. Since both fields $301A_2$ and $301B_3$ correspond to street addresses, field values $305A_{1,2}$-$305A_{y,2}$ and field values $305A_{1,3}$-$305A_{T,3}$ may be used to compare similarities between records 303 in the vendor datasets 112A and 112B. In one implementation, in response to determining a field value 305A of a record 303A in the vendor dataset 112A is identical or within a threshold to a field value 305B of a record 303B in the vendor dataset 112B, the data assessment service 136 may determine a similarity between the records 303A and 303B and establish a link between the records 303A and 303B.

In one implementation, indexed datasets 220A and 220B generated by the index service 130 may be used for determining similarity between a record 303A from vendor dataset 112A and a record 303B from vendor dataset 112B. In this implementation, the index service 130 generates one or more match keys for each record 303A in the vendor dataset 112A and one or more match keys for each record 303B in the vendor dataset 112B. These match keys may be used for indexing the ingested datasets 204A and 204B (in particular the vendor datasets 112A and 112B) to generate the indexed datasets 220A and 220B, respectively.

Figure 4:
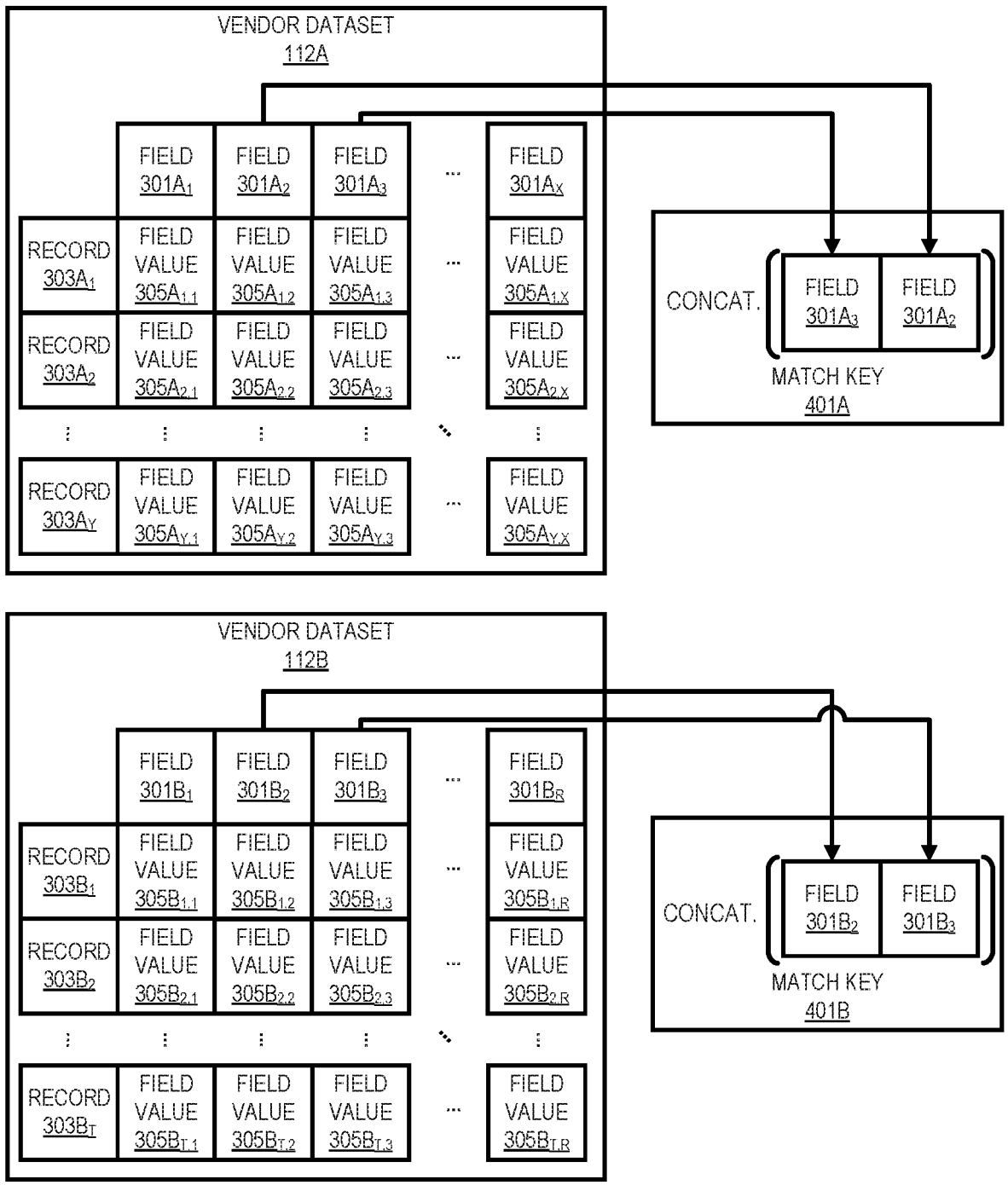
FIG. 4 shows match key definitions for the two vendor datasets according to one example implementation.

As described herein, match keys are combinations of two or more fields or individual fields from the vendor datasets 112. For example, FIG. 4 shows a match key 401A defined for the vendor dataset 112A and a match key 401B defined for the vendor dataset 112B. The match key 401A is defined as the concatenation of the field $301A_3$ with the field $301A_2$ while the match key 401B is defined as the concatenation of the field $301B_2$ with the field $301B_3$. In one implementation, the match keys 401A and 401B used to index the vendor datasets 112A and 112B, respectively, are based on inputs from one or more administrators of the DAAS system 110 and/or from a vendor(s) of a vendor system(s) 104.

In some implementations, operations may be performed on fields 301 prior to being used to generate match keys 401. For example, one or more of normalization, tokenization, character or token filtering, or any other similar operation may be performed on the fields 301 prior to being used to generate match keys 401.

As noted above, match keys 401A are generated by the index service 130 for each record 303A in the vendor dataset 112A and match keys 401B are generated by the index service 130 for each record 303B in the vendor dataset 112B. FIG. 5 shows match keys $401A_{1-Y}$ for the vendor dataset 112A that are used by the index service 130 to index the vendor dataset 112A to generate the indexed dataset 220A and match keys $401B_{1-T}$ for the vendor dataset 112B that are used by the index service 130 to index the vendor dataset 112B to generate the indexed dataset 220B. Although shown as a single match key 401 being generated for each of the vendor datasets 112A and 112B, in other implementations, multiple match keys 401 may be generated for one or both of the vendor datasets 112A and 112B.

The indexed datasets 220A and 220B generated by the index service 130 may be stored in the info retrieval system 218 such that the data assessment service 136 may determine similarities between records 303 in the vendor datasets 112A and 112B and link a record 303A from the vendor dataset 112A to a record in the vendor dataset 112B in response to determining that the records 303A and 303B are similar. For example, upon determining a match key 401A in the indexed dataset 220A corresponding to a record 303A in the vendor dataset 112A is identical or within a threshold to a match key 401B in the indexed dataset 220B corresponding to a record 303B in the vendor dataset 112B, the data assessment service 136 may determine that these records 303A and 303B are similar and in response may generate a link between the records 303A and 303B.

In one implementation, linking the records 303A and 303B, which were determined to be similar, may involve including an identifier of each record 303A/303B in a field 301A/301B of the other record 303A/303B. In some implementations, this link may be represented in one or both of the vendor datasets 112A and 112B and the indexed datasets 220A and 220B. For example, FIG. 6 shows record $303A_1$ linked to record $303B_4$ as represented in the indexed datasets 220A and 220B according to one example implementation. In this example, the indexed dataset 220A includes the field $301A_1$, which is an identifier (ID) field, the field $301A_2$, which is a street address field, and the field $301A_3$, which is a Phone Number field. As shown in FIG. 6, the record $303A_1$ has a field value $305A_{1,1}$ of "13561" (corresponding to an identifier of the record $303A_1$), a field value $305A_{1,2}$ of "1 Elm St." (corresponding to a street address associated with the record $303A_1$), and a field value $305A_{1,3}$ of "555-555-5555" (corresponding to a phone number associated with the record $303A_1$). The indexed dataset 220A may also include the match key field 501A, which corresponds to the match key 401A. As described above and shown in FIGS. 4 and 5, the match key 401A is defined as the concatenation of the field $301A_3$ with the field $301A_2$. In the case of the record $303A_1$, the field value $305A_{1,3}$ of "555-555-5555" is concatenated with the field value $305A_{1,2}$ of "1 Elm St." such that the match key $401A_1$ for the record $303A_1$ is "555-555-55551 Elm St.".

As also shown in FIG. 6, the indexed dataset 220B includes the field $301B_1$, which is an identifier (ID) field, the field $301B_2$, which is a phone number field, and the field $301B_3$, which is a street address field. The record $303B_4$ has a field value $305B_{4,1}$ of "32451" (corresponding to an identifier of the record $303B_4$), a field value $305B_{4,2}$ of "555-555-5555" (corresponding to a phone number associated with the record $303B_4$), and a field value $305B_{4,3}$ of "1 Elm St." (corresponding to a street address associated with the record $303B_4$). The indexed dataset 220B may also include the match key field 501B, which corresponds to the match key 401B. As described above and shown in FIGS. 4 and 5, the match key 401B is defined as the concatenation of the field $301B_2$ with the field $301B_3$. In the case of the record $303B_2$, the field value $305B_{4,2}$ of "555-555-5555" is concatenated with the field value $305B_{4,3}$ of "1 Elm St." such that the match key $401B_4$ for the record $303B_4$ is "555-555-55551 Elm St.".

In the above example of FIG. 6, the data assessment service 136 may determine that the match key $401A_1$ of the record $303A_1$ is identical to the match key $401B_4$ of the record $303B_4$. In response to this determination, the data assessment service 136 may link the record $303A_1$ to the record $303B_4$. As noted above, this linking may be performed by including an identifier of each record $303A_1/303B_4$ in a field 301 of the other record $303A_1/303B_4$. For example, as shown in FIG. 6, indexed dataset 220A includes a link field 601A and the indexed dataset 220B includes a link field 601B. In this example, the link field value $603A_1$ may be set to the identifier "32451" of the record $303B_4$ and the link field value $603B_4$ may be set to the identifier "13561" of the record $303A_1$.

Figure 7:
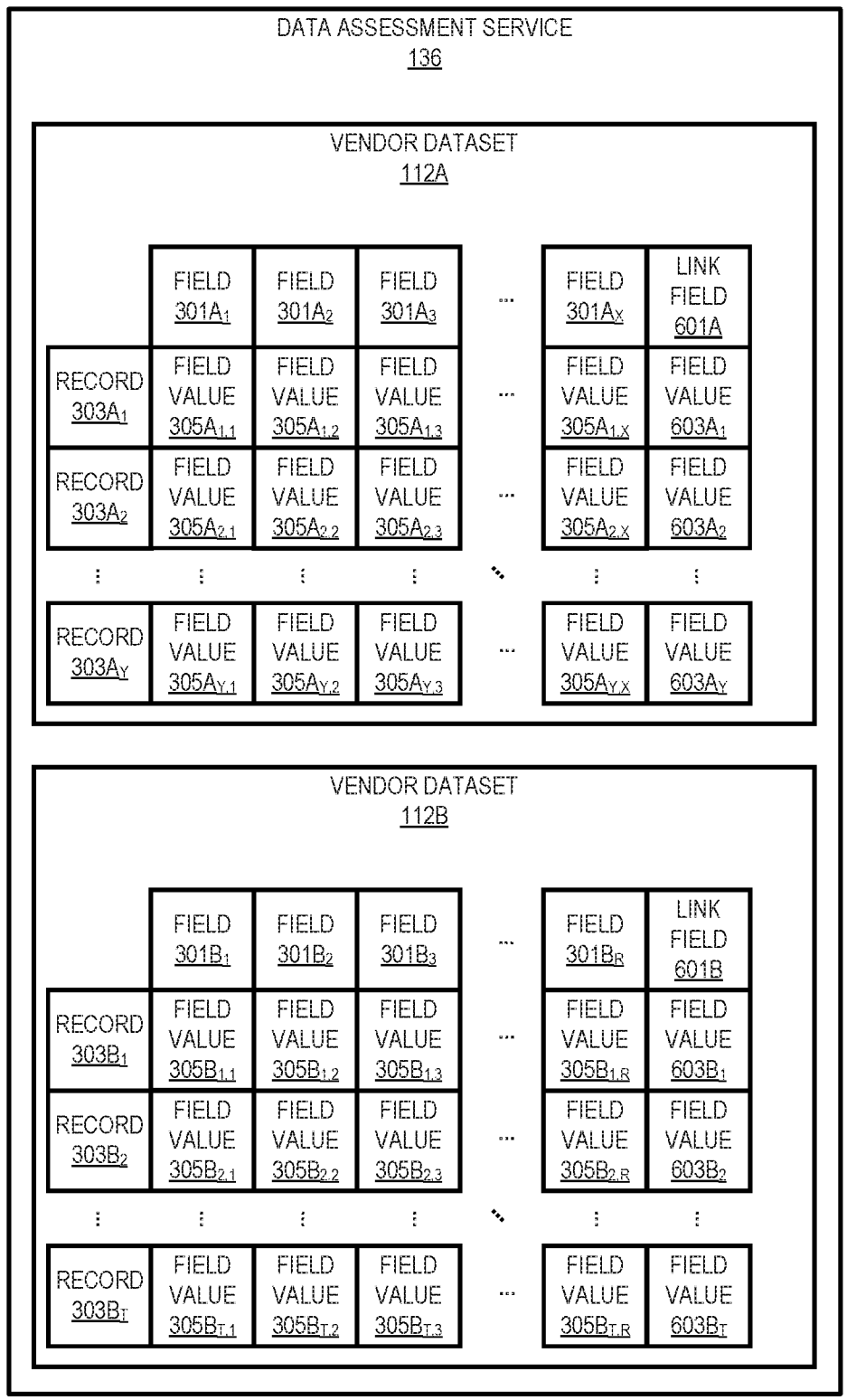
FIG. 7 shows a record for one vendor dataset linked to a record from another vendor dataset according to one example implementation.

Although shown as linking a record 303A in the indexed dataset 220A to a record 303B in the indexed dataset 220B, since the records 303A and 303B are also represented in the vendor dataset 112A and 112B, respectively, links in the indexed datasets 220A and 220B may also link a record 303A in the vendor dataset 112A with a record 303B in the vendor dataset 112B. As noted above, in some implementations, the link fields 601A and 601B may also or instead be included in the vendor dataset 112A and 112B, respectively. For example, FIG. 7 shows the link field 601A in the vendor dataset 112A and the link field 601B in the vendor dataset 112B. As will be described in greater detail below, a link between a record 303A in the indexed dataset 220A and a record 303B in the indexed dataset 220B or a link between a record 303A in the vendor dataset 112A and a record 303B in the vendor dataset 112B may be used for augmenting search query results and match query results.

As noted above, the indexed datasets 220A and 220B generated by the index service 130 may be stored in the info retrieval system 218. The indexed datasets 220A and 220B may be used by the match service 134 to perform a match query 118 to update records previously imported by a customer system 108. For example, a customer system 108 may include a customer relationship management system. A customer using the customer system 108 may be reviewing a set of records previously imported from the DAAS system 110 (e.g., using the search service 130). The customer relationship management system may include an interface that allows the customer to trigger the update of records in the customer relationship management system that were previously imported from the DAAS system 110. Triggering this update causes the customer relationship management system to generate and transmit a match query 118 to the DAAS system 110. In one implementation, the match query 118 may be directed to the vendor dataset 112A (i.e., a single vendor dataset 112) or to vendor dataset 112A and vendor dataset 112B (e.g., multiple vendor datasets 112).

Figure 8:
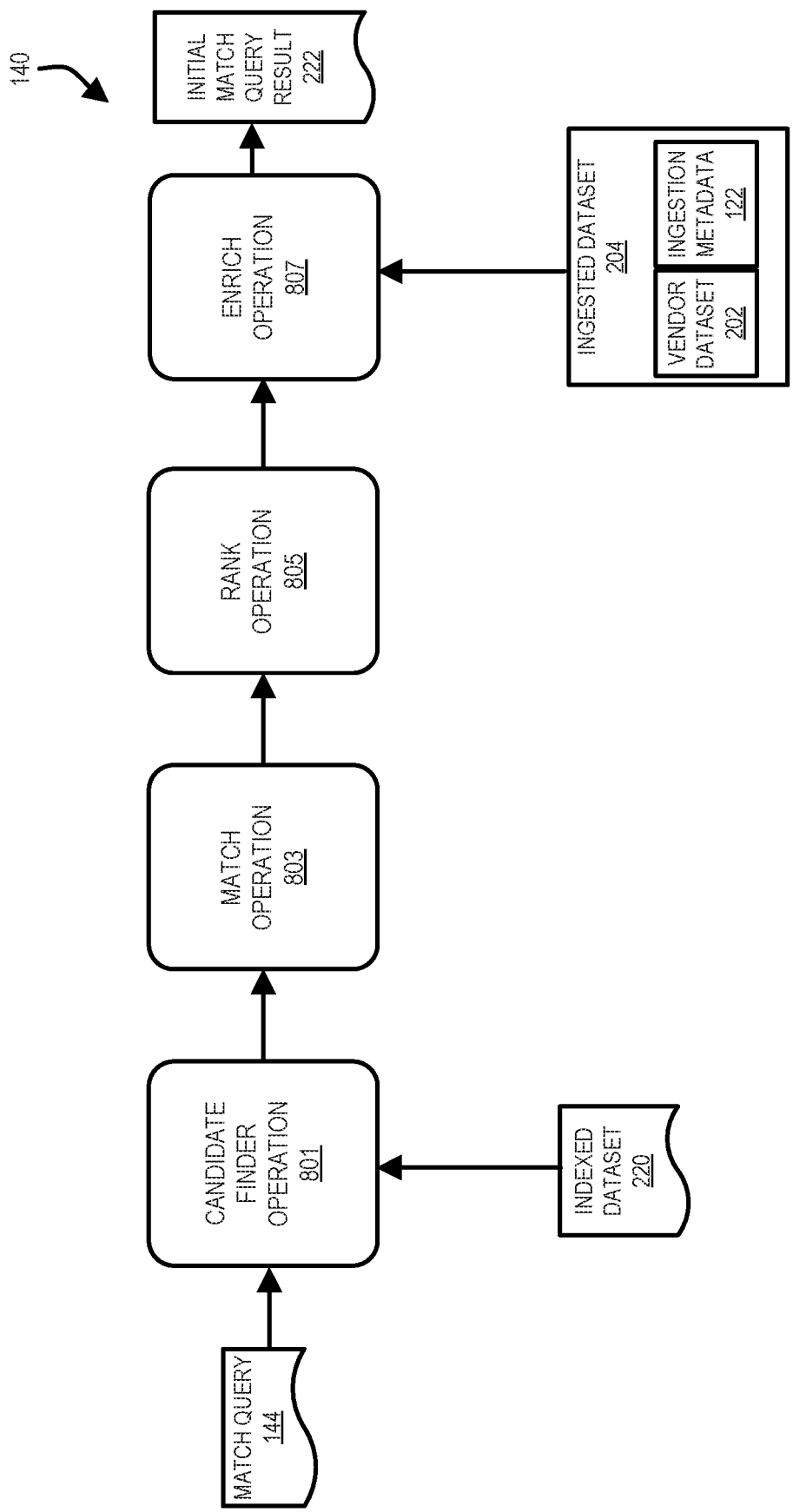
FIG. 8 shows a detailed block diagram of a match service according to one example implementation.

FIG. 8 shows a detailed block diagram of the match service 134 according to one example implementation. As shown in FIG. 8, the match service 134 may include four operations: a candidate finder operation 801, a matching operation 803, a ranking operation 805, and an enrich operation 807. In one implementation, the candidate finder operation 801 determines a set of candidate records 303 from an indexed dataset 220 based on match keys 401 of records 303 in the indexed dataset 220 that are identical to a match key of the match query 118. The matching operation 803 determines a set of matched records 303 from the candidate records 303 that meet the criteria of the match query 118. The ranking operation 805 ranks the matched records 303 based on scores produced by the matching operation 803 to produce a ranked set of records 303. The ranked set of records 303 may be compared with a corresponding ingested dataset 204 by the enrich operation 807, and in particular a vendor dataset 112, to determine records 303 in the vendor dataset 112 that correspond to records in the ranked set of records 303 (e.g., using a primary identifier in each of the ranked set of records 303 and the vendor dataset 112). These matching records 303 in the vendor dataset 112 may be an initial match query result 222. The initial match query result 222 may be stored in the info retrieval system 218 such that the data assessment service 136 may generate a final match query result 280A as will be described below.

In one implementation, each of the ingested datasets 204A and 204B may be received and analyzed by an analysis service 128. More specifically, the vendor datasets 112A and 112B within the ingested datasets 204A and 204B, respectively, may be analyzed (based on mappings in the ingestion metadata 122A and 122B, respectively) using an ordered set of one or more analysis operations. These analysis operations place each of the vendor datasets 112A and 112B, that is part of the ingested datasets 204A and 204B, in a form that will produce improved search query results for the customer systems 108 than the vendor dataset 112A or the vendor dataset 112B on its own. For example, the analysis operations used by the analysis service 128 may involve various transformations and actions to be performed on the vendor datasets 112A and 112B to generate an analyzed dataset 210A and an analyzed dataset 210B. These analysis operations may include one or more of normalization, tokenization, character or token filtering, field generation, and indexing operations.

After the analyzed datasets 210A and 210B have been generated, the analyzed datasets 210A and 210B may be stored in the info retrieval system 218 and the search service 130 may provide mechanisms to generate initial search query results 224 responsive to receiving a communication from customer systems 108 (e.g., a search query 116; responsive to a user interacting with a GUI on a device in communication with an application provided in the cloud, the application generates the search query 116). The search query 116, used by the search service 130 to generate initial search query results 224, describes particular records within one or more of the vendor datasets 112A and 112B that a customer would like to import into the customer system 108. The search service 130 may determine the initial search query results 224 by locating records 303 in an analyzed dataset 210 (e.g., one of the analyzed datasets 210A and 210B) that meet the criteria of the search query 116. The records 303 of the analyzed dataset 210 that meet the criteria of the search query 116 may be compared with a corresponding ingested dataset 204 by the search service 130, and in particular a vendor dataset 112, to determine records 303 in the vendor dataset 112 that correspond to records 303 of the analyzed dataset 210 that meet the criteria of the search query 116 (e.g., using a primary identifier in each of the records 303 of the analyzed dataset 210 that meet the criteria of the search query 116 and the vendor dataset 112). These matching records 303 in the vendor dataset 112 may be an initial search query result 224. The initial search query result 224 may be stored in the info retrieval system 218 such that the data assessment service 136 may generate a final search query result 280B as will be described below.

As described above, the match service 134 may generate an initial match query result 222 and the search service 130 may generate an initial search query result 224 that are stored in the info retrieval system 218. The data assessment service 136 may access each of the initial match query results 222 and the initial search query results 224 to augment each with additional records 303.

In some implementations, the data assessment service 136 may add records 303 to initial match query results 222 or initial search query results 224 based on links made by the data assessment service 136. For example, as shown in FIG. 6 and described above, the data assessment service 136 may determine that a record 303A of the vendor dataset 112A is similar to a record 303B of the vendor dataset 112B. In response to this similarity determination, the data assessment service 136 may link the records 303A and 303B. The link may be represented in the vendor datasets 112A and 112B and/or the indexed datasets 220A and 220B as shown in FIGS. 6 and 7.

For each record 303 in the initial match query result 222, the data assessment service 136 may determine any records 303 in a different vendor dataset 112 that the record 303 in the initial match query result 222 links to. These records 303 that are linked to are combined with the initial match query result 222 to generate a final match query result 280A. Similarly, for each record 303 in the initial search query result 224, the data assessment service 136 may determine any records 303 in a different vendor dataset 112 that the record 303 in the initial search query result 224 links to. These records 303 that are linked to are combined with the initial search query result 224 to generate a final search query result 280B.

Figure 9B:
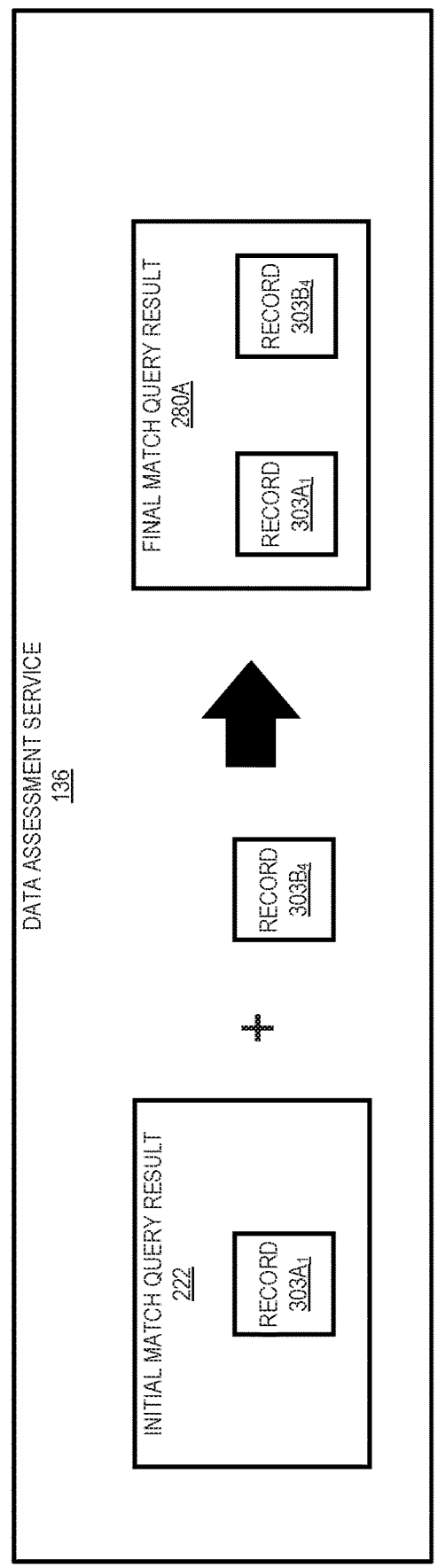
FIG. 9B shows a final match query result according to one example implementation.

For example, FIG. 9A shows an initial match query result 222 that was generated by the match service 134. As shown, the initial match query result 222 includes the record $303A_1$, which was previously shown in the example of FIG. 6. As shown in FIG. 6, the record $303A_1$ is linked to the record $303B_4$. Based on this link, the data assessment service 136 may combine the record $303B_4$ with the initial match query result 222 to produce the final match query result 280A as shown in FIG. 9B. The final match query result 280A may thereafter be provided to a customer system 108 via the serving interface 120.

In one implementation, the serving interface 120 may provide the final match query result 280A and/or the final search query result 280B over a network. The network may comply with one or more network protocols, including an IEEE protocol, a 3GPP protocol, or similar wired and/or wireless protocols, and may include one or more intermediary devices for routing data from the DAAS system 110 to a customer system 108. In some implementations, the serving interface 120 may utilize a FTP, a NFS, or a similar protocol/system.

As described above, the DAAS system 110, and in particular the data assessment service 136, may link similar records 303 from separate vendor datasets 112. These linked records 303 may be used for augmenting initial match query results 222 or initial search query results 224 by including linked records 303 in final match query results 280A or final search query results 280B provided to customers 108. In one implementation, the record(s) 303 that was added to the initial match query result 222 or the initial search query result 224 may be provided or presented to a customer of a customer system 108 as a recommend record 303. By linking records 303 in separate vendor datasets 112, the DAAS system 110, and in particular the data assessment service 136, provides cross vendor query functionality and data record 303 recommendations across vendor datasets 112 based on record 303 similarity. This eliminates the need for vendors to manually determine similarity between records 303 of different vendor datasets 112 that are possibly provided by different vendors and vendor systems 104 and/or are of different data types.

Figure 10:
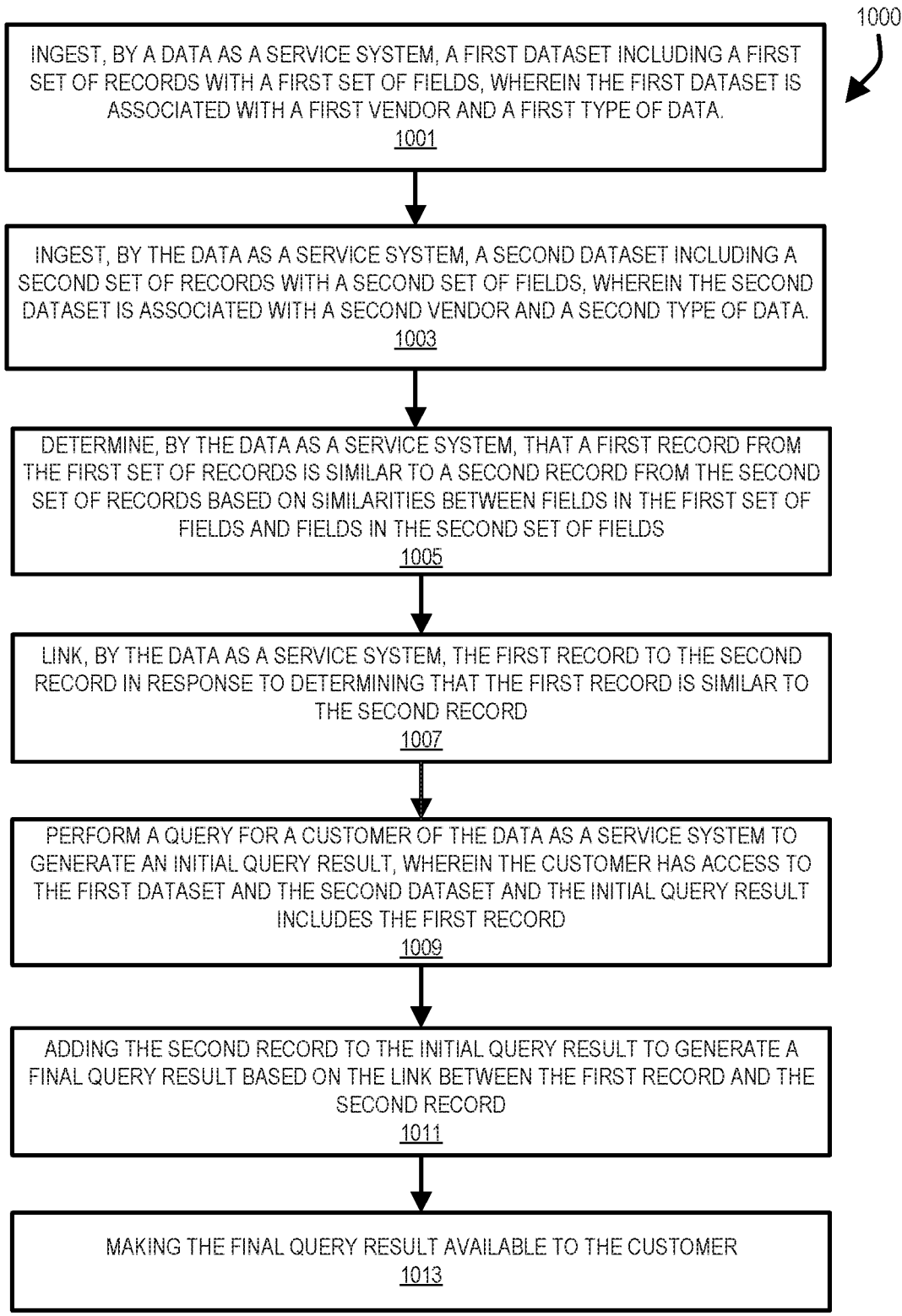
FIG. 10 shows a method for linking a record in a vendor dataset associated with a vendor and a type of data to a record in a vendor dataset associated with a different vendor or a vendor dataset associated with a different type of data according to one example implementation.

Turning now to FIG. 10, a method 1000, according to one example implementation, will be described for linking a record 303 in a vendor dataset 112 associated with a vendor and a type of data to a record 303 in a vendor dataset 112 associated with a different vendor or a vendor dataset 112 associated with a different type of data. The operations in the flow diagram of FIG. 10 will be described with reference to the exemplary implementations of the other figures. However, it should be understood that the operations of the flow diagram can be performed by implementations other than those discussed with reference to the other figures, and the implementations discussed with reference to these other figures can perform operations different than those discussed with reference to the flow diagrams. Although described and shown in FIG. 10 in a particular order, the operations of the method 1000 are not restricted to this order. For example, one or more of the operations of the method 1000 may be performed in a different order or in partially or fully overlapping time periods. Accordingly, the description and depiction of the method 1000 is for illustrative purposes and is not intended to restrict to a particular implementation.

In some implementations, one or more of the operations of the method 1000 may be performed by components of the DAAS architecture 100. For example, one or more of the operations of the method 1000 may be performed by one or more of the vendors systems 104, the customer systems 108, and/or the DAAS system 110. In particular, the ingestion service 126, the analysis service 128, the index service 130, the search service 130, the match service 134, and/or the data assessment service 136 may work in conjunction with the vendor systems 104 and the customer systems 108 to perform the operations of the method 1000.

In one implementation, the method 1000 may commence at operation 1001 with ingestion by the DAAS system 110 of a first vendor dataset 112A that is received by the DAAS system 110 from a vendor via a vendor system 104 (e.g., the vendor system $104_1$). The first vendor dataset 112A may include a first set of fields 301 and may be associated with a first data type. For example, the first vendor dataset 112A may include the fields $301A_{1-X}$ with field values $305A_{1,1}$-$305A_{Y,X}$ corresponding to the records $303A_{1-Y}$ shown in FIG. 3 and the records $305A_{1-Y}$ of the vendor dataset 112A may correspond to contacts (i.e., current or prospective business contacts). In one implementation, the ingesting of the first dataset 112A is based on first ingestion metadata 122A that maps one or more fields 301A in the first set of fields $301A_{1-X}$ to a set of fields 301 defined in the DAAS system 110.

At operation 1003 the DAAS system 110 may ingest a second vendor dataset 112B that is received by the DAAS system 110 from a vendor via a vendor system 104. In some implementations, the vendor dataset 112A and the vendor dataset 112B may be received for ingestion by the DAAS system 110 from the same vendor system 104 and consequently the same vendor (e.g., both the vendor datasets 112A and 112B are received from the same vendor via the vendor system $104_1$) or the vendor dataset 112A and the vendor dataset 112B may be received for ingestion by the DAAS system 110 from different vendor systems 104 and consequently different vendors (e.g., the vendor dataset 112A is received from a vendor via the vendor system $104_1$ and the vendor dataset 112B is received from a different vendor via the vendor system $104_2$). The second vendor dataset 112B may include a second set of fields 301 and may be associated with a second data type. For example, the second vendor dataset 112B may include the fields $301B_{1-R}$ with field values $305B_{1,1}$-$305B_{T,R}$ corresponding to the records $303B_{1-T}$ shown in FIG. 3 and the records $303B_{1-T}$ of the vendor dataset 112B may correspond to accounts (i.e., current or prospective business accounts). In one implementation, the ingesting of the first dataset 112B is based on second ingestion metadata 122B that maps one or more fields 301B in the first set of fields $301B_{1-R}$ to a set of fields 301 defined in the DAAS system 110.

At operation 1005 the DAAS system 110 may determine that a first record 303A from the first vendor dataset 112A is similar to a second record 303B from the second vendor dataset 112B. In one implementation, this similarity between the first record 303A and the second record 303B may be determined based on one or more fields 301 in the first set of fields 301 and one or more fields 301 of the second set of fields 301. For example, in one implementation, similarity between the first record 303A and the second record 303B may be determined based on generation of match keys 401 for the first record 303A and the second record 303B. In this example implementation, a match key 401A for the first record 303A is generated based on one or more of the fields $301A_{1-X}$ (e.g., a single field $301A_{1-X}$ or the concatenation of two or more fields $301A_{1-X}$). Similarly, a match key 401B for the first record 303B is generated based on or one or more of the fields $301B_{1-R}$ (e.g., a single field $301B_{1-R}$ or the concatenation of two or more fields $301B_{1-R}$). The first record 303A is determined to be similar to the second record 303B in response to the match key 401A of the first record 303A being identical or within a threshold of the match key 401B of the second record 303B. For example, as shown in FIG. 6, the match key $401A_1$ of the record $303A_1$ of the vendor dataset 112A is identical to the match key $401B_4$ of the record $303B_4$ of the vendor dataset 112B. Based on the match key $401A_1$ being identical to the match key $401B_4$, operation 1005 may determine that the records $303A_1$ and $303B_4$ are similar.

At operation 1007, the DAAS system 110 may link the first record 303A to the second record 303B in response to determining that the first record 303A and the second record 303B are similar. In one implementation, linking the first record 303A to the second record 303B may be performed by including an identifier of the second record 303B in a field 301A of the first record 303A. For example, as shown in FIG. 6, an identifier of the record $303B_4$ may be included in the link field 601A of the record $303A_1$ in response to operation 1005 determining that the records $303A_1$ and $303B_4$ are similar (e.g., the link field value $603A_1$ may be set to the identifier "32451" of the record $303B_4$). An identifier of the record $303A_1$ may be included in the link field 601B of the record $303B_4$ in response to operation 1005 determining that the records $303A_1$ and $303B_4$ are similar (e.g., the link field value $603B_4$ may be set to the identifier "13561" of the record $303A_1$).

At operation 1009, the DAAS system 110 may perform a query involving the first vendor dataset 112A. For example, the DAAS system 110 may query the first vendor dataset 112A at operation 1009 based on a match query 116 to produce an initial match query result 222 that includes one or more records 303A from the first vendor dataset 112A. For instance, the initial match query result 222 may include the record $303A_1$ as shown in FIG. 9A. Alternatively, the DAAS system 110 may query the first vendor dataset 112A at operation 1009 based on a search query 118 to produce an initial search query result 224 that includes one or more records 303A from the first vendor dataset 112A. For instance, the initial search query result 224 may include the record $303A_1$.

At operation 1011, a record 303B from the second vendor dataset 112B may be added or combined with the initial match query result 222 to produce a final match query result 280A. The record 303B from the second vendor dataset 112B may be added to the initial match query result 222 based on a link between a record 303A in the initial match query result 222. For example, as shown in FIG. 9B, the record $303B_4$ may be added to the initial match query result 222 to produce the final match query result 280A based on a link between the record $303A_1$, which is included in the initial match query result 222, and the record $303B_4$. Accordingly, the final match query result 280A includes a record 303A from the first vendor dataset 112A and a record 303B from the second vendor dataset 112B. Alternatively, a record 303B from the second vendor dataset 112B may be added or combined at operation 1011 with the initial search query result 224 to produce a final search query result 280B. Accordingly, the final search query result 280B includes a record 303A from the first vendor dataset 112A and a record 303B from the second vendor dataset 112B.

At operation 1013, one or more of the final match query result 280A and the final search query result 280B may be made available to a customer via a corresponding customer system 108. For example, the final match query result 280A or the final search query result 280B may be made available to a customer system 108 via the serving interface 120. In one implementation, the record 303B that was added to the initial match query result 222 to produce the final match query result 280A or to the initial search query result 224 to produce the final search query result 280B may be presented to the customer as a recommended record 303B from the vendor dataset 112B based on a similarity with a record 303A in the vendor dataset 112A that met the criteria of the match query 118 or search query 116.

In one implementation, the DAAS system 110 may be realized using a micro-services architecture and/or using big-data technologies to store and process vendor datasets 112 in a timely efficient manner. This enables the DAAS system 110 to host a multitude of data records 303 (e.g., thousand, millions, etc.) and serve these records (e.g., via final match query results 280A or the final search query results 280B) efficiently to customer systems 108.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 11A:
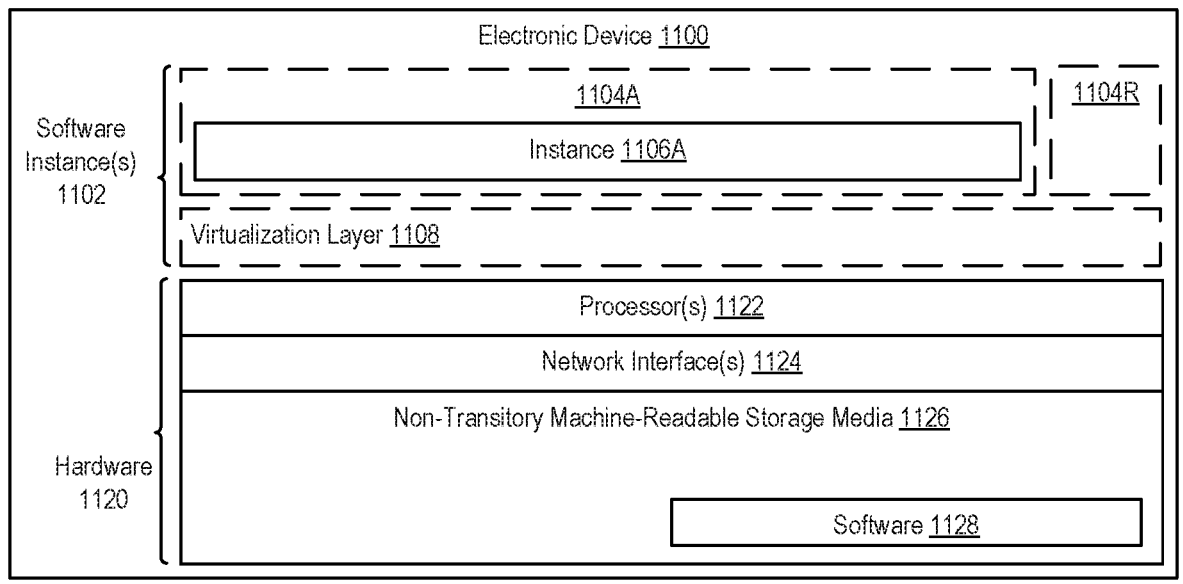
FIG. 11A illustrates an electronic device according to one example implementation.

FIG. 11A is a block diagram illustrating an electronic device 1100 according to some example implementations. FIG. 11A includes hardware 1120 comprising a set of one or more processor(s) 1122, a set of one or more network interfaces 1124 (wireless and/or wired), and non-transitory machine-readable storage media 1126 having stored therein software 1128 (which includes instructions executable by the set of one or more processor(s) 1122). Each of the previously described vendor systems 104 and customer systems 108 and the DAAS system 110 may be implemented in one or more electronic devices 1100. In one implementation: 1) each of the vendor systems 104 and customer systems 108 is implemented in a separate one of the electronic devices 1100 (e.g., in user electronic devices operated by users where the software 1128 represents the software to implement vendor systems 104 and customer systems 108 to interface with the DAAS system 110 (e.g., a web browser, a native client, a portal, a command-line interface, and/or an application program interface (API) based upon protocols such as Simple Object Access Protocol (SOAP), Representational State Transfer (REST), etc.)); 2) the DAAS system 110 is implemented in a separate set of one or more of the electronic devices 1100 (e.g., a set of one or more server electronic devices where the software 1128 represents the software to implement the DAAS system 110); and 3) in operation, the electronic devices implementing the vendor systems 104 and customer systems 108 and the DAAS system 110 would be communicatively coupled (e.g., by a network) and would establish between them (or through one or more other layers) connections for submitting vendor datasets 112 to the DAAS system 110 and returning final match query results 280A and final search query results 280B to the customer systems 108. Other configurations of electronic devices may be used in other implementations (e.g., an implementation in which the vendor systems 104, the customer systems 108, and the DAAS system 110 are implemented on a single electronic device 1100).

In electronic devices that use compute virtualization, the set of one or more processor(s) 1122 typically execute software to instantiate a virtualization layer 1108 and software container(s) 1104A-R (e.g., with operating system-level virtualization, the virtualization layer 1108 represents the kernel of an operating system (or a shim executing on a base operating system) that allows for the creation of multiple software containers 1104A-R (representing separate user space instances and also called virtualization engines, virtual private servers, or jails) that may each be used to execute a set of one or more applications; with full virtualization, the virtualization layer 1108 represents a hypervisor (sometimes referred to as a virtual machine monitor (VMM)) or a hypervisor executing on top of a host operating system, and the software containers 1104A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1128 (illustrated as instance 1106A) is executed within the software container 1104A on the virtualization layer 1108. In electronic devices where compute virtualization is not used, the instance 1106A on top of a host operating system is executed on the "bare metal" electronic device 1100. The instantiation of the instance 1106A, as well as the virtualization layer 1108 and software containers 1104A-R if implemented, are collectively referred to as software instance(s) 1102.

Alternative implementations of an electronic device may have numerous variations from that described above. For example, customized hardware and/or accelerators might also be used in an electronic device.

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 11B:
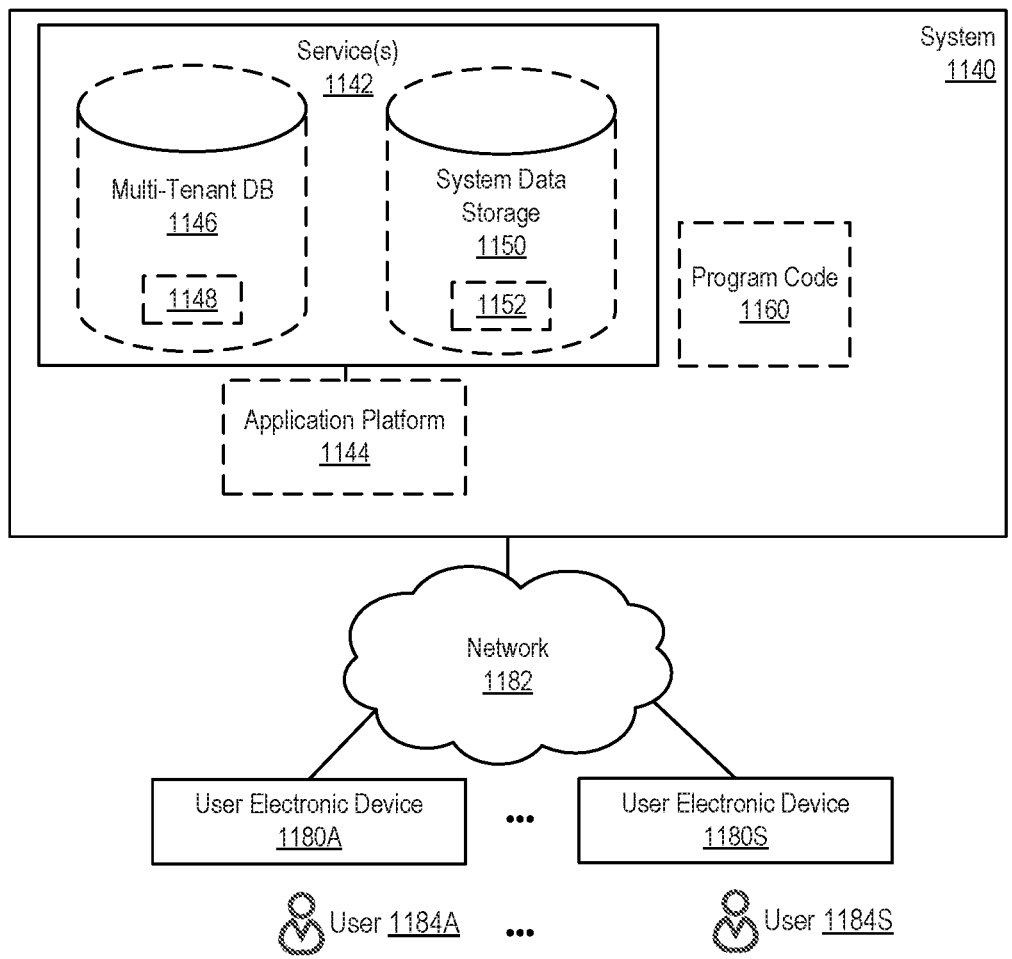
FIG. 11B shows a block diagram of an environment where an on-demand, DAAS system may be implemented according to one example implementation.

FIG. 11B is a block diagram of an environment where a DAAS system 110 may be deployed, according to some implementations. A system 1140 includes hardware (a set of one or more electronic devices) and software to provide service(s) 1142, including the DAAS system 110. The system 1140 is coupled to user electronic devices 1180A-S over a network 1182. The service(s) 1142 may be on-demand services that are made available to one or more of the users 1184A-S working for one or more other organizations (sometimes referred to as outside users) so that those organizations do not need to necessarily be concerned with building and/or maintaining a system, but instead makes use of the service(s) 1142 when needed (e.g., on the demand of the users 1184A-S). The service(s) 1142 may communication with each other and/or with one or more of the user electronic devices 1180A-S via one or more Application Programming Interface(s) (APIs) (e.g., a Representational State Transfer (REST) API). The user electronic devices 1180A-S are operated by users 1184A-S.

In one implementation, the system 1140 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1140 may include an application platform 1144 that enables PAAS for creating, managing, and executing one or more applications developed by the provider of the application platform 1144, users accessing the system 1140 via one or more of user electronic devices 1180A-S, or third-party application developers accessing the system 1140 via one or more of user electronic devices 1180A-S.

In some implementations, one or more of the service(s) 1142 may utilize one or more multi-tenant databases 1146, as well as system data storage 1150 for system data 1152 accessible to system 1140. In certain implementations, the system 1140 includes a set of one or more servers that are running on server electronic devices and that are configured to handle requests for any authorized user associated with any tenant (there is no server affinity for a user and/or tenant to a specific server). The user electronic device 1180A-S communicate with the server(s) of system 1140 to request and update tenant-level data and system-level data hosted by system 1140, and in response the system 1140 (e.g., one or more servers in system 1140) automatically may generate one or more Structured Query Language (SQL) statements (e.g., one or more SQL queries) that are designed to access the desired information from the one or more multi-tenant database 1146 and/or system data storage 1150.

In some implementations, the service(s) 1142 are implemented using virtual applications dynamically created at run time responsive to queries from the user electronic devices 1180A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1160 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1144 includes an application setup mechanism that supports application developers' creation and management of applications, which may be saved as metadata by save routines. Invocations to such applications, including the DAAS system 110, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1182 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1140 and the user electronic devices 1180A-S.

Each user electronic device 1180A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 1140. For example, the user interface device can be used to access data and applications hosted by system 1140, and to perform searches on stored data, and otherwise allow a user 1184 to interact with various GUI pages that may be presented to a user 1184. User electronic devices 1180A-S might communicate with system 1140 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1180A-S might include an HTTP client, commonly referred to as a "browser," for sending and receiving HTTP messages to and from server(s) of system 1140, thus allowing users 1184 of the user electronic device 1180A-S to access, process and view information, pages and applications available to it from system 1140 over network 1182.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for linking records from different datasets based on similarities of the records, wherein the method comprises:
   ingesting, by a data as a service (DAAS) system, a first dataset including a first set of records with a first set of fields, wherein the first dataset is associated with a first vendor and a first type of data;
   ingesting, by the DAAS system, a second dataset including a second set of records with a second set of fields, wherein the second dataset is associated with a second vendor and a second type of data;
   determining, by the DAAS system, that a first record from the first set of records is similar to a second record from the second set of records based on similarities between fields in the first set of fields and fields in the second set of fields;
   linking, by the DAAS system, the first record to the second record in response to determining that the first record is similar to the second record, wherein the first vendor is different than the second vendor and the first type of data is different than the second type of data such that at least one field in the first set of fields is not a field in the second set of fields or at least one field in the second set of fields is not a field in the first set of fields;
   performing a query for a customer of the DAAS system to generate an initial query result, wherein the customer has access to the first and second datasets and the initial query result includes the first record; and
   adding, following performance of the query, the second record to the initial query result to generate a final query result based on the link between the first record and the second record that indicates that the second record is similar to the first record.

2. The method of claim 1, wherein determining that the first record is similar to the second record comprises:
   generating one or more match keys for the first record based on one or more fields in the first set of fields; and
   generating one or more match keys for the second record based on one or more fields in the second set of fields.

3. The method of claim 2, wherein determining that the first record is similar to the second record further comprises:
   determining that the one or more match keys for the first record are identical or within a threshold of the one or more match keys for the second record.

4. The method of claim 3, further comprising:
   making the final query result available to the customer.

5. The method of claim 4, wherein the query is a match query that updates records previously provided to the customer.

6. The method of claim 4, wherein the final query result indicates that the second record is a recommended record for the customer based on the link to the first record.

7. The method of claim 3, wherein each match key in the one or more match keys for the first record is a combination of two or more fields in the first set of fields or a single field in the first set of fields and each match key in the one or more match keys for the second record is a combination of two or more fields in the second set of fields or a single field in the second set of fields.

8. The method of claim 1, wherein the ingesting of the first dataset is based on first ingestion metadata that maps one or more fields in the first set of fields to a set of fields defined in the data as a service system, and
   wherein the ingesting of the second dataset is based on second ingestion metadata that maps one or more fields in the second set of fields to the set of fields defined in the data as a service system.

9. A non-transitory machine readable medium that stores instructions that, when executed by a processor of an electronic device, cause the electronic device to:
   ingest a first dataset including a first set of records with a first set of fields, wherein the first dataset is associated with a first vendor and a first type of data;

ingest a second dataset including a second set of records with a second set of fields, wherein the second dataset is associated with a second vendor and a second type of data;

determine that a first record from the first set of records is similar to a second record from the second set of records based on similarities between fields in the first set of fields and fields in the second set of fields;

link the first record to the second record in response to determining that the first record is similar to the second record, wherein the first vendor is different than the second vendor and the first type of data is different than the second type of data such that at least one field in the first set of fields is not a field in the second set of fields or at least one field in the second set of fields is not a field in the first set of fields;

perform a query for a customer of a data as a service system to generate an initial query result, wherein the customer has access to the first dataset and the second dataset and the initial query result includes the first record; and add, following performance of the query, the second record to the initial query result to generate a final query result based on the link between the first record and the second record that indicates that the second record is similar to the first record.

10. The non-transitory machine readable medium of claim 9, wherein determining that the first record is similar to the second record comprises:

generating one or more match keys for the first record based on one or more fields in the first set of fields; and generating one or more match keys for the second record based on one or more fields in the second set of fields.

11. The non-transitory machine readable medium of claim 10, wherein determining that the first record is similar to the second record further comprises:

determining that the one or more match keys for the first record are identical or within a threshold of the one or more match keys for the second record.

12. The non-transitory machine readable medium of claim 11, wherein the instructions further cause the electronic device to:

make the final query result available to the customer.

13. The non-transitory machine readable medium of claim 12, wherein the query is a match query that updates records previously provided to the customer.

14. The non-transitory machine readable medium of claim 12, wherein the final query result indicates that the second record is a recommended record for the customer based on the link to the first record.

15. The non-transitory machine readable medium of claim 11, wherein each match key in the one or more match keys for the first record is a combination of two or more fields in the first set of fields or a single field in the first set of fields and each match key in the one or more match keys for the second record is a combination of two or more fields in the second set of fields or a single field in the second set of fields.

16. The non-transitory machine readable medium of claim 9, wherein the ingesting of the first dataset is based on first ingestion metadata that maps one or more fields in the first set of fields to a set of fields defined in a data as a service system, and wherein the ingesting of the second dataset is based on second ingestion metadata that maps one or more fields in the second set of fields to the set of fields defined in the data as a service system.

17. A data as a service system for linking records from different datasets based on similarities of the records, wherein the data as a service system comprises:

a set of memory devices; and a processor coupled to the set of memory devices, wherein the processor processes instructions stored in the set of memory devices to:

ingest a first dataset including a first set of records with a first set of fields, wherein the first dataset is associated with a first vendor and a first type of data and to ingest a second dataset including a second set of records with a second set of fields, wherein the second dataset is associated with a second vendor and a second type of data;

determine that a first record from the first set of records is similar to a second record from the second set of records based on similarities between fields in the first set of fields and fields in the second set of fields and to link the first record to the second record in response to determining that the first record is similar to the second record, wherein the first vendor is different than the second vendor and the first type of data is different than the second type of data such that at least one field in the first set of fields is not a field in the second set of fields or at least one field in the second set of fields is not a field in the first set of fields;

perform a query for a customer of the data as a service system to generate an initial query result, wherein the customer has access to the first dataset and the second dataset and the initial query result includes the first record; and add, following performance of the query, the second record to the initial query result to generate a final query result based on the link between the first record and the second record that indicates that the second record is similar to the first record.

18. The data as a service system of claim 17, wherein determining that the first record is similar to the second record comprises:

generating one or more match keys for the first record based on one or more fields in the first set of fields;

generating one or more match keys for the second record based on one or more fields in the second set of fields; and determining that the one or more match keys for the first record are identical or within a threshold of the one or more match keys for the second record.

19. The data as a service system of claim 18, wherein the processor further processes instructions stored in the set of memory devices to:

make the final query result available to the customer, wherein the final query result indicates that the second record is a recommended record for the customer based on the link to the first record.

* * * * *